United States Patent [19]
Kniffin et al.

[11] Patent Number: 6,072,402
[45] Date of Patent: Jun. 6, 2000

[54] SECURE ENTRY SYSTEM WITH RADIO COMMUNICATIONS

[75] Inventors: John M. Kniffin, Portland; Ron McCauley, Salem; Ralph H. Wells, III, Monmouth; John W. Sherman, Corvallis; Wayne F. Larson, Salem, all of Oreg.

[73] Assignee: SLC Technologies, Inc., Salem, Oreg.

[21] Appl. No.: 07/819,345

[22] Filed: Jan. 9, 1992

[51] Int. Cl.⁷ .................................................. H04Q 1/00
[52] U.S. Cl. ............................... 340/825.31; 340/825.44; 340/825.69; 379/103
[58] Field of Search .................... 340/825.31, 825.32, 340/825.33, 825.34, 825.3, 825.54, 825.69, 825.72, 825.44, 311.1; 455/38, 1, 344; 379/103, 102, 105; 235/382

[56] References Cited

U.S. PATENT DOCUMENTS

| | | | |
|---|---|---|---|
| 3,337,992 | 8/1967 | Tolson | 340/533 |
| 3,812,403 | 5/1974 | Gartner | 317/134 |
| 4,157,534 | 6/1979 | Schachter | 340/147 MD |
| 4,209,782 | 6/1980 | Donath et al. | 340/147 MD |
| 4,218,690 | 8/1980 | Ulch et al. | 340/149 R |
| 4,236,068 | 11/1980 | Walton | 235/380 |
| 4,275,385 | 6/1981 | White | 340/525 |
| 4,415,893 | 11/1983 | Roland et al. | 340/825.31 |
| 4,491,843 | 1/1985 | Boubouleix | 343/702 |
| 4,525,865 | 7/1985 | Mears | 455/186 |
| 4,531,237 | 7/1985 | Bar-on et al. | 455/343 |
| 4,543,955 | 10/1985 | Schroeppel | 128/635 |
| 4,596,984 | 6/1986 | Bongard et al. | |
| 4,600,829 | 7/1986 | Walton | 235/439 |
| 4,609,780 | 9/1986 | Clark | 179/2 A |
| 4,713,661 | 12/1987 | Boone et al. | 340/994 |
| 4,721,954 | 1/1988 | Mauch | 340/825.31 |
| 4,727,368 | 2/1988 | Larson | 340/825.31 |
| 4,727,369 | 2/1988 | Rode | 340/825.31 |
| 4,760,393 | 7/1988 | Mauch | 340/825.31 |
| 4,766,746 | 8/1988 | Henderson | 70/63 |
| 4,777,556 | 10/1988 | Imran | 361/155 |
| 4,800,255 | 1/1989 | Imran | 235/382 |
| 4,831,374 | 5/1989 | Masel | 340/825.31 |
| 4,851,652 | 7/1989 | Imran | 235/382 |
| 4,864,115 | 9/1989 | Imran | 235/492 |
| 4,910,510 | 3/1990 | Davis et al. | 340/825.44 |
| 4,931,789 | 6/1990 | Pinnow | |
| 4,958,632 | 9/1990 | Duggan | 128/419 PG |
| 4,962,449 | 10/1990 | Schlesinger | 364/200 |

(List continued on next page.)

FOREIGN PATENT DOCUMENTS

| | | |
|---|---|---|
| 307 485 | 3/1989 | European Pat. Off. . |
| 320 373 | 6/1989 | European Pat. Off. . |
| 393784 | 10/1990 | European Pat. Off. . |
| 2542792 | 3/1983 | France . |
| 2604808 | 10/1986 | France . |
| 3-262885 | 11/1991 | Japan . |
| 2144249 | 2/1985 | United Kingdom . |
| 90/13096 | 3/1990 | WIPO . |
| WO 91/18169 | 5/1991 | WIPO . |
| WO 91/20026 | 6/1991 | WIPO . |

OTHER PUBLICATIONS

Motorola Technical Developments, vol. 10, p. 36, Mar. 1990, Marino, Gail, "Pager and Garage Door Opener Combination," (Copy in 340/311.1).

Websters New World Dictionary, p. 1108, definition of radio frequency.

Primary Examiner—Brian Zimmerman
Attorney, Agent, or Firm—Klarquist Sparkman Campbell Leigh & Whinston, LLP

[57] ABSTRACT

A secure entry system makes use of radio transmissions to communicate with locks, keys, and related components throughout the system. The radio transmissions can be made using a paging system, a cellular telephone system, or any other RF carrier. Some embodiments employ a cellular telephone in lieu of an electronic key. Others integrate a paging receiver within an electronic key to provide a unit with dual functionality. The system is illustrated with reference to exemplary applications in the industrial site security, real estate lockbox, and transportation fields.

31 Claims, 4 Drawing Sheets

U.S. PATENT DOCUMENTS

| | | | |
|---|---|---|---|
| 4,962,522 | 10/1990 | Marian | 379/105 |
| 5,014,049 | 5/1991 | Bosley | 340/825.31 |
| 5,016,273 | 5/1991 | Hoff | 380/10 |
| 5,020,135 | 5/1991 | Kasparian et al. | 455/76 |
| 5,113,427 | 5/1992 | Ryoichi et al. | 340/825.44 |
| 5,124,696 | 6/1992 | Bosley . | |
| 5,252,965 | 10/1993 | Gidwani et al. . | |
| 5,478,995 | 12/1995 | Wallerstorfer et al. . | |
| 5,619,191 | 4/1997 | Lambropoulos et al. . | |
| 5,650,774 | 7/1997 | Drori . | |
| 5,717,387 | 2/1998 | Suman et al. . | |

SECURE ENTRY SYSTEM WITH RADIO COMMUNICATIONS

FIELD OF THE INVENTION

The present invention relates to secure entry systems, and more particularly relates to the use of radio in such systems.

BACKGROUND AND SUMMARY OF THE INVENTION

In the century since radio science was developed, radio signal transmission has found myriad applications. Some have been in the field of electronic security systems.

A familiar example is a garage door opener. A radio transmitter is used to relay instruction signals to a receiver unit, causing the receiver unit to activate a door opening mechanism.

More sophisticated access control devices operate in conjunction with a personal access card that includes a battery, a microprocessor, a receiver and a transmitter. The access control device periodically broadcasts an interrogation signal, which the card receives when it is brought into close proximity thereto. In response, the card transmits an RF reply signal to the access control device, authorizing access to the secured area. French patent publication 2,604, 808 and European patent publication EP 393,784 are illustrative of such systems.

Radio data transmission is sometimes used in home security systems to relay data from motion, continuity, vibration or other detectors to a central monitoring unit.

Radio frequency energy is sometimes used to convey operating power to an otherwise unpowered unit. U.S. Pat. No. 4,851,652, for example, illustrates a secure entry system in which a passive lock unit is powered from RF energy radiated from an associated key card. The lock also receives data from the key by modulation of the same RF energy. French patent publication 2,542,792 shows such a system in which a passive key is powered by an RF signal that is coupled to it by an associated lock.

Radio is sometimes used outside the secure entry field to relay reprogramming instructions to remote units. U.S. Pat. Nos. 4,525,865 and 4,910,510, for example, disclose pagers and other radios whose operational characteristics can be reprogrammed remotely by radio. U.S. Pat. 5,020,135 discloses such a system that also features remote memory dumps and diagnostics from radio transceivers using radio signals. U.S. Pat. Nos. 4,543,955 and 4,958,632 disclose cardiac pacemakers and other implantable devices that can be reprogrammed via use of radio. U.S. Pat. No. 4,713,661 discloses an annunciator system for buses wherein a sequence of bus stop information can be programmed into the system via radio. U.S. Pat. No. 5,016,273 discloses a videocassette recorder (VCR) that is equipped with a paging receiver to provide a number of features, including remote VCR programming.

PCT published patent publication WO 90/13096 (which corresponds to U.S. application Ser. No. 07/338,718, filed Apr. 14, 1989) discloses a "very smart card"-type credit card that is equipped with a paging (radio) receiver, permitting the card to receive signals periodically reauthorizing its continued use. The disclosed card additionally includes a keyboard, microprocessor, a magnetic transducer (and/or external electrical contacts), and an LCD display.

U.S. Pat. No. 4,766,746, assigned to the present assignee, teaches that locks and keys can be equipped with radio receivers to provide a secure entry system with remote programming capabilities. In particular, U.S. Pat. No. 4,766, 746 discloses a system in which radio is used to send disable instructions to key units and to send lockout list data or access codes to lock units.

The present invention expands on the technology disclosed in U.S. Pat. No. 4,766,746 and provides a number of additional features. These features will be more readily apparent from the following detailed description, which proceeds with reference to the accompanying drawings.

DETAILED DESCRIPTION

First Embodiment

Figure 1:
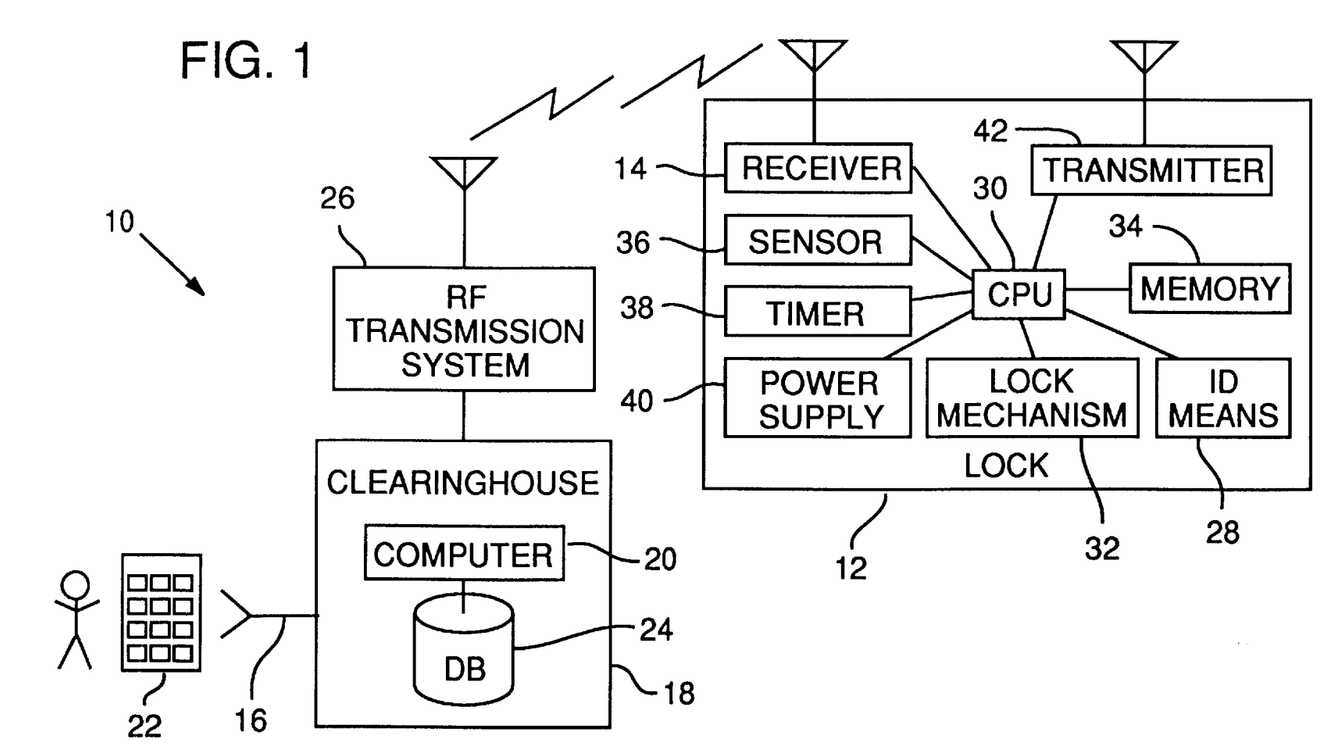
FIG. 1 illustrates a secure access system according to a first embodiment of the present invention.

Referring to FIG. 1, a first embodiment 10 of a secure entry system according to the present invention includes a lock (or other access control device) 12 having a cellular, paging, or other RF receiver 14 integrated therein. The lock may be a door lock at an industrial site, a real estate lockbox, or any other kind of access control device.

A user who seeks access to the lock establishes communication (by a cellular telephone, by a conventional telephone, or by some other communications link 16) to a clearinghouse 18. A series of voice prompts synthesized by a computer 20 at the clearinghouse and relayed to the user over the link 16 solicits the user to identify the lock 12 to which access is desired. (The lock is usually identified by a number, but in other embodiments is identified by more descriptive information.) The clearinghouse also requests the user's Personal Identification Number (PIN number). This data may be provided by the user, for example, using a telephone's Touch Tone pad 22.

If the clearinghouse determines, by reference to a database 24, that the user should be authorized to access the identified lock, the clearinghouse causes a radio transmission to the lock 12 to be made. The transmission, which may be via a system 26 such as a paging system, a cellular telephone system, or other RF carrier—depending on the type of receiver 14 with which the lock is equipped—authorizes an access by the user. Desirably, this authorization is valid only for a predetermined time period, such as 30 minutes (the "window" period).

The clearinghouse 18 also desirably reports back to the user regarding the action taken on the user's request. In the preferred embodiment, the voice synthesizer reports to the user whether access permission is granted, as well as information about the window period. An exemplary report may be, "Your request for access authorization to lock 246 has been approved. Your window of authorization will end at 3:15 p.m."

Before terminating the communications link 16 with the user, the clearinghouse can relay any status information which should be provided to the user. Some of this status information can be lock-specific. For the case of a real estate lockbox system, for example, this lock-specific status information might include a change in price of the listed real estate, a reminder to disable a burglar alarm, a notice that the owner or another real estate agent is at the house, etc. If the equipment with which the user has contacted the clearinghouse is equipped with a video display, then graphical data specifically relating to the property can be provided from the clearinghouse to the user. This transmission is achieved by slow scan video transmission, or by such other video format as the bandwidth of the communications link between the user and the clearinghouse may permit.

The clearinghouse can also relay status information to the user that is not lock specific. This information often relates to news regarding administration of the lock system.

It will be recognized that the clearinghouse has knowledge of all accesses that it has authorized. Such data is desirably compiled in the database 24 at the clearinghouse and serves as an authorization log. However, since a user may request authorization to access a lock, but not actually do so, the authorization log is not necessarily an accurate indicator of actual accesses. Accordingly, an access log is also desirably compiled at the lock itself, as described below.

As noted, the clearinghouse relays to the lock certain data, namely the fact that an user is coming, the identity of the user, and the time period during which the user is to be able to access the lock. By this arrangement, the lock needn't be programmed with a list of authorized users, or even a list of disallowed users. Instead, the lock is configured to deny entry to everyone. The exception is the user identified by a radio transmission—and this user only for a predetermined period of time. Security is thereby enhanced.

In the preferred embodiment, all of the locks in a system utilize common radio reception frequencies. Authorization data can be targeted to different units (or groups of units) by address data included in the authorization transmission. The use of addressed data packets, and a representative packet-based paging protocol employing such addressing, is disclosed in U.S. Pat. Nos. 4,713,808 and 4,897,835. In other embodiments, targeting can be achieved by time division multiplexing (i.e. time slot protocol), wherein each receiver awakens in staggered brief intervals to listen for messages. Still further, both techniques can be used together. (The systems disclosed in U.S. Pat. Nos. 4,713,808 and 4,897,835 employ both techniques.)

Of course, in other embodiments, different locks (or groups of locks) can be fixedly tuned to different frequencies. Still further, a single lock receiver can be dynamically tuned among several frequencies in order to assure good signal reception. PCT publication WO 91-00676 discloses a suitable system of the latter type.

When the user arrives at the door, the user must be identified to the lock. This can be accomplished by one of several identification means 28. In one, the user keys in a PIN number or other identifying data onto a keypad associated with the lock. In another, the user enters a PIN number or other identifying data onto a keypad of a key, and couples the key to the lock. In yet another, the user carries an identification tag that is remotely sensed by a proximity detector. (In some applications, heretofore limited to animals, it is desirable to surgically affix or implant the identification tag.) A variety of other physiological identification means, including retinal scanners, voice print analyzers, and fingerprint sensors, could alternatively be used.

In response to identification of the authorized user at the lock within the prescribed time period, a lock microprocessor CPU 30 instructs a lock mechanism 32 to unlock. (The type of lock mechanism employed will obviously depend on the particular application. The design of a lock mechanism to suit a particular application is well within the capabilities of one of ordinary skill in this art.) Data relating to the access is logged into a memory 34 (typically, but not always, associated with the lock) for subsequent analysis.

Sometimes an authorized user may visit the lock 12, and be sensed by the lock's identification means 28 (such as a proximity detector), but not actually access the secured area. In real estate lockbox systems, for example, this may occur when a visiting real estate agent and prospective buyer make an external inspection of the listed property and find it not to the buyer's liking, prompting them to leave without actually gaining access to the lockbox. In an industrial site security system, a night watchman may check the perimeter of a secured building without going in.

In such situations, it is often desirable to confirm actual entry of a person into the secured area, and log this fact into the access log memory. Often such confirmation can be obtained by a sensor associated 36 with the door to the secured area. A door latch, for example can be equipped with a sensor to indicate when the bolt is retracted. A door knob can be equipped with a capacitive sensor to sense its use. A real estate lockbox can be equipped with a sensor to confirm that the key compartment is actually opened. Such sensors can be implemented by those of ordinary skill in this art without undue experimentation.

Other sensors 36 can be used to confirm the presence of a person within the secured area immediately following the expected entry. Such sensors are well known in the art and include motion detectors, door mat entry switches, break-beam optical sensors, etc.

An element shared in common with all such approaches is that they involve participation by the user—participation that would not generally occur absent actual access.

As noted, the data relayed by radio from the clearinghouse to the lock desirably includes data specifying a time window. A timer 38 in the lock (which timer can be implemented by circuitry or by appropriate programming of the CPU 30) checks that the access takes place within the specified window.

(In the preferred embodiment, the time window begins at the time of the user/clearinghouse transaction. In other embodiments, however, it may be desireable to authorize a requested access well in advance, in which case the time window may not start for a matter of hours or days after the user/clearinghouse transaction.)

In a variant of the illustrated embodiment, the clearinghouse authorizes a particular user's access for a variable time period. For example, the time period may last until 9:00 p.m., regardless of when it begins, or it may last until another user is authorized to access the lock.

As noted, it is conventional for secure access systems to record data relating to lock access. If the power supply 40 (which may be a battery) at the lock permits, the lock can be equipped with a transmitter 42 to reports of lock accesses to a central station. (While FIG. 1 shows the transmitter and receiver circuits using separate antennas, it may be preferable to share a single antenna between both circuits.) In one such embodiment, access data is radio-forwarded in real time, as the accesses occurs. In another embodiment, a batch system is used, wherein access data accumulates in the lock memory 34 until a threshold number of entries is reached, at which time an RF transmission is made. As with other RF transmissions described herein, these transmissions can be made using a cellular telephone service, if desired.

In other arrangements, of course, the data can be manually collected from the lock memory, such as by a key with access log-reading capability. A number of such keys are disclosed in the electronic lock patents listed below.

In yet other arrangements, the access log data is RF-transmitted to the clearinghouse, but programming instructions and authorization data are disseminated manually, such as by keys with programming capabilities, again as disclosed in the electronic lock patents listed below.

The foregoing arrangement is particularly well suited for use in newly constructed houses. A lock 12 can be installed on the house during construction and can be used by the local real estate board in lieu of a keybox to admit authorized agents and prospective buyers. Thereafter, when the house is sold, the lock can remain on the door for use by the purchaser, if desired (or alternatively can be disabled). A purchaser might find it advantageous, for example, to let others admit themselves into the house, provided a record of such entries is maintained (which lock 12 would do). During this period, the purchaser would have exclusive rights to program the lock through the clearinghouse 18. When the house is later offered for sale, authorization to program the lock can again be extended to the local real estate board, again permitting the house to be shown by authorized agents.

In some real estate lockbox situations, the house listed for sale is occupied by the present owner, who may not want interruptions at certain times (for example, when taking a bath). The preferred embodiment permits such a homeowner to call the clearinghouse and instruct, by Touch Tone commands, that no agents are to be authorized within a "privacy" period that is defined by the homeowner. Agents seeking authorization during the privacy period would be notified by the clearinghouse of the temporary inaccessibility of the property.

In a variant of the foregoing embodiment, the lockbox is equipped with a "privacy" button that can be pushed by the homeowner to effect an hour long privacy period. If the lockbox is equipped with a transmitter, this change in status can be relayed to the clearinghouse, which again provides the status information to inquiring agents.

It will be recognized that one application of the foregoing radio authorized access control technology is implementation of "Star-Trek"-type doors. Such doors are radio-programmed periodically with the identities of persons permitted to pass therethrough. A proximity sensor on one side of the door senses the identity of an approaching user, checks the door lock's memory 34, and opens the door if the user is found to be authorized. A second sensor is desirably used on the opposite side of the door. This sensor confirms the passage of the person through the door, and can also sense the approach of persons from the other direction. Together, the two sensors provide redundant data confirming whether a person is entering or leaving the secured area.

The door's memory can be reprogrammed with updated authorization data daily, or at such other interval as may be appropriate. A user's authorization can remain valid until the lock is next radio-reprogrammed, at which time the user must be reauthorized if the user's access rights are to continue.

In the preferred form of the foregoing embodiment 10, the system is not limited to authorizing just a single key for a given lock at any given time. Instead, the system can authorize a plurality of keys for a given lock, either all for the same time window or for overlapping time windows.

Second Embodiment

Figure 2:
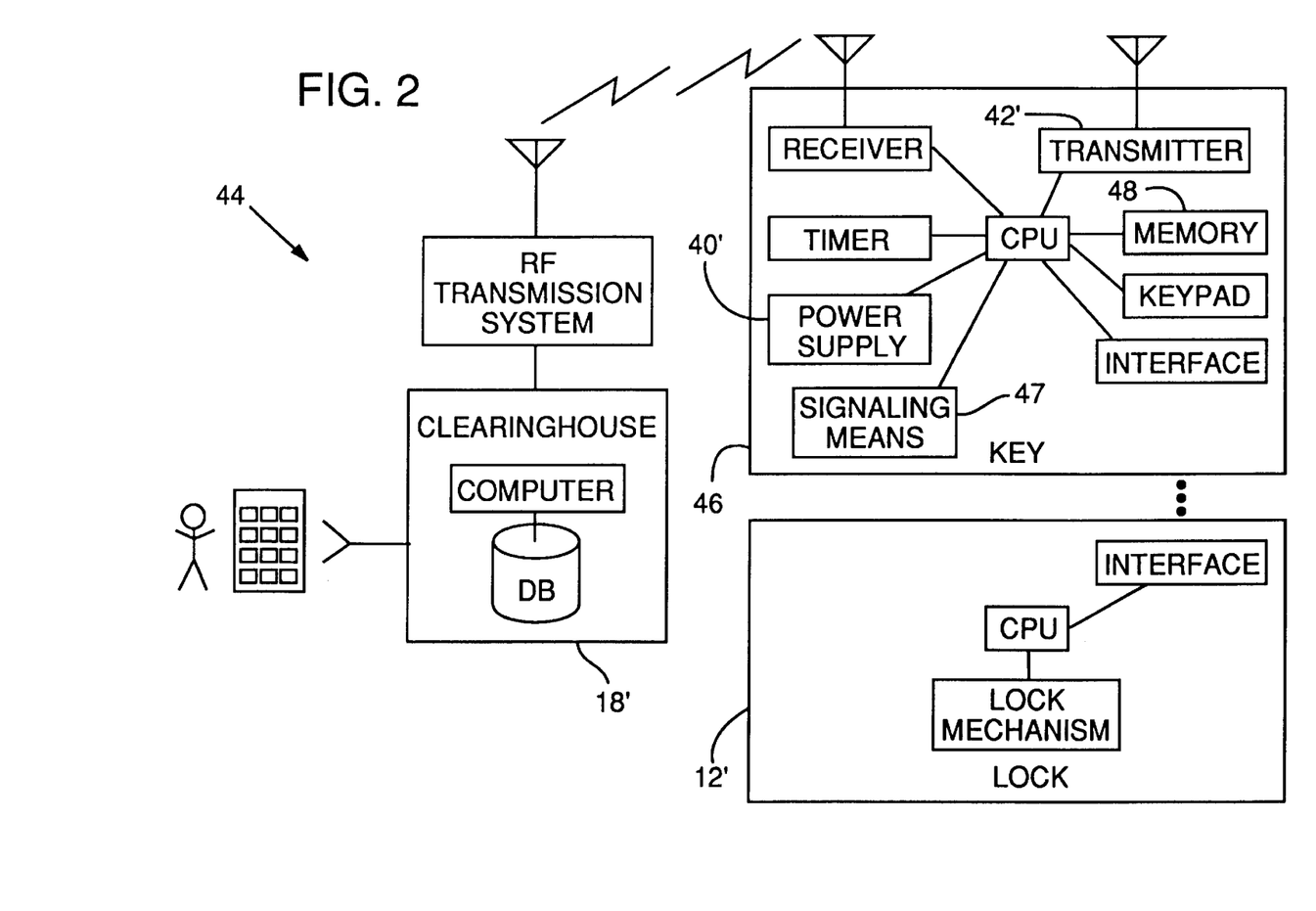
FIG. 2 illustrates a secure access system according to a second embodiment of the present invention.

FIG. 2 shows a second embodiment 44 of the invention which is similar to that shown in FIG. 1, except that the unit with the RF communications capability is the key 46 rather than the lock 12'. Thus, when a user's request to access a particular lock 12' is verified by the clearinghouse 18', an authorizing (also known as enabling) signal is sent by radio to that user's key 46. Data defining a time window is also desirably sent and limits the time period within which the key is effective. The enabling data enables the key only to access the lock requested through the clearinghouse.

In this embodiment, a simpler lock 12' can be used—one that responds to any key (provided, of course, that the key has first received an enabling signal). System maintenance is thereby facilitated, since keys requiring maintenance can be more readily be transported to a maintenance facility than can locks.

Although the interface between the key and lock is not particularly detailed in FIG. 2, a number of known interfacing techniques can be used. These techniques include opto-electronic coupling (such as disclosed in U.S. Pat. No. 4,727,368 and others), RF coupling (such as disclosed in U.S. Pat. No. 4,851,652 and others), inductive coupling (such as disclosed in U.S. Pat. No. 4,766,746 and others), and direct electrical coupling (such as disclosed in U.S. Pat. No. 4,594,637 and others).

In variations of this embodiment 44, of course, the lock can be quite sophisticated and can employ many or all of the features disclosed herein and in the patents cited below.

Since the lock 12' in this second embodiment needn't have its own power source (i.e. to power a receiver), the lock can be powered from the key. Illustrative techniques for powering a lock from a key are disclosed in U.S. Pat. Nos. 4,594,637, 4,851,652, and in copending applications Ser. Nos. 07/740,424 and 07/790,642.

Desirably, this second embodiment 44 includes provision for compiling an access log—preferably in addition to the authorization log maintained by the clearinghouse 18'. In one form of the invention, such a log is maintained in a memory 48 in the key 46. Key-based access log systems are disclosed, by way of example, in U.S. Pat. No. 4,916,443 and in copending applications Ser. Nos. 07/740,424 and 07/790,642. Means for assuring that access log data is dumped periodically from the key memories are also disclosed in these cited references.

Again, if the key power supply 40' permits, the key can be provided with a transmitter 42' to relay access log data to a central station, either in real time or in batch fashion. In one form of the invention, the key uses rechargeable batteries and is connected to a recharger periodically. When the key is so connected, the radio transmission from the key takes place—taking advantage of the additional power available from the recharger's power supply. If desired, the radio transmission circuitry and antenna can form a part of the recharger unit, with the data being transferred thereto over the same contacts that provide recharging power to the key.

In another form of this embodiment, an access log can be maintained in a memory in the lock. Access log data stored in such a lock memory can be uploaded to a key using technology such as disclosed in U.S. Pat. Nos. 4,766,746, 4,800,255, and in copending applications Ser. Nos. 07/740, 424 and 7/790,642. A self-building database system, like that disclosed in U.S. Pat. No. 4,916,443, can also be advantageously incorporated in such an embodiment.

Once access data has been uploaded from the lock memory to the key, it can be relayed to a central database in a variety of ways, such as acoustic data transmission, wired data transmission, etc., as disclosed in the just-noted patent references, as well as by the above-described radio technique.

If desired, rather than enabling keys on an as-needed basis, the clearinghouse can make a daily (or hourly, etc.) transmission authorizing, for another day (or hour, etc.), all keys in the system whose users are in good standing with the system proprietor. If the authorization is valid only for an hour, the clearinghouse can effect a lockout from all locks between the hours of, say 9:00 p.m. to 6:00 a.m. by discontinuing the authorization transmissions between 8:00 p.m. and 6:00 a.m.

In embodiments employing paging transmissions to communicate with keys, a key can be equipped with a signalling means 47 (such as a beeper, vibrator, and/or alphanumeric display) so that it can also serve a conventional pager function, in addition to serving as a key.

Third Embodiment

Figure 3:
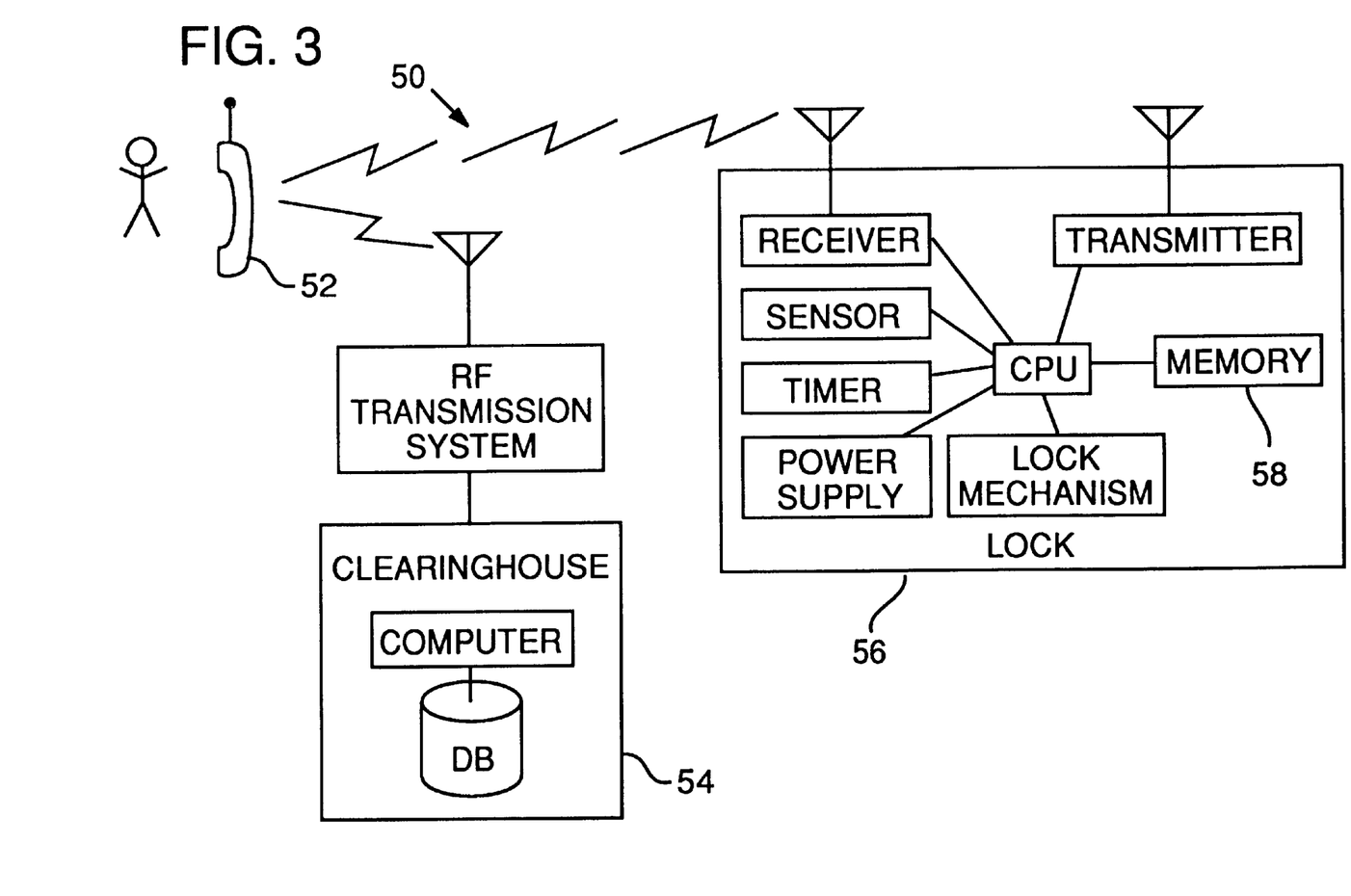
FIG. 3 illustrates a secure access system according to a third embodiment of the present invention.

A third embodiment 50 according to the present invention is shown in FIG. 3 and utilizes a cellular telephone 52 as the identification device.

In this embodiment, a user operates the cellular telephone 52 to call the clearinghouse 54 and request access to a particular lock 56. After suitable verification (by a PIN number or the like), the clearinghouse transmits an RF signal to the identified lock and causes it to briefly make itself susceptible to being unlocked (such as for 30 seconds). Within this interval, the user must perform some manual operation (such as pushing on a door) to complete the unlocking operation. If the manual operation is not completed within the allotted period, the lock resecures itself.

In a variation of this embodiment, the clearinghouse does not make an authorization transmission to the lock. Instead, it RF-transmits authorization data back to the cellular telephone in the form of audio tones. The user acoustically couples the telephone to the lock to transfer these tones to the lock to thereby authorize the requested access.

In a further variation of this embodiment, the cellular telephone 52 does not transmit to the clearinghouse. Rather, its transmitted RF signal is received by the lock 56 itself, and the user operates the buttons on the telephone as he would buttons on a key card to gain access to the secured area.

In one such embodiment, the lock transmits a verification request to the clearinghouse after receiving the direct RF request but prior to permitting the requested access. In a second such embodiment, the lock checks whether the user identified by the button operations is on a list of authorized users (or on a list of locked out users) maintained in a lock memory 58. In a third embodiment, the lock simply permits access without any verification checks.

By all of these embodiments 50, the user needn't carry an access card or similar device. Instead, the user relies exclusively on a cellular telephone. This aspect of this invention is believed to have particular promise in view of the growing ubiquity of cellular telephones, especially in professions such as real estate.

While the foregoing description of the third embodiment has focused on the use of a cellular radio transmission to transmit access-related data to a lock, it will be recognized that a variety of other data can likewise be transmitted. For example, an authorized user can issue instructions through a cellular telephone causing the lock's operating characteristics to be reprogrammed. In U.S. Pat. No. 4,766,746, and in copending application Ser. Nos. 07/740,424 and 07/790,642, for example, locks are disclosed that include a memory in which "characterization data" is stored. Any of the data in such a characterization memory (such as data determining daily disable times, timing constants, function enables, etc.) can be altered by suitable instructions issued by a user and received by the lock via a radio transmission.

Fourth Embodiment

Figure 4:
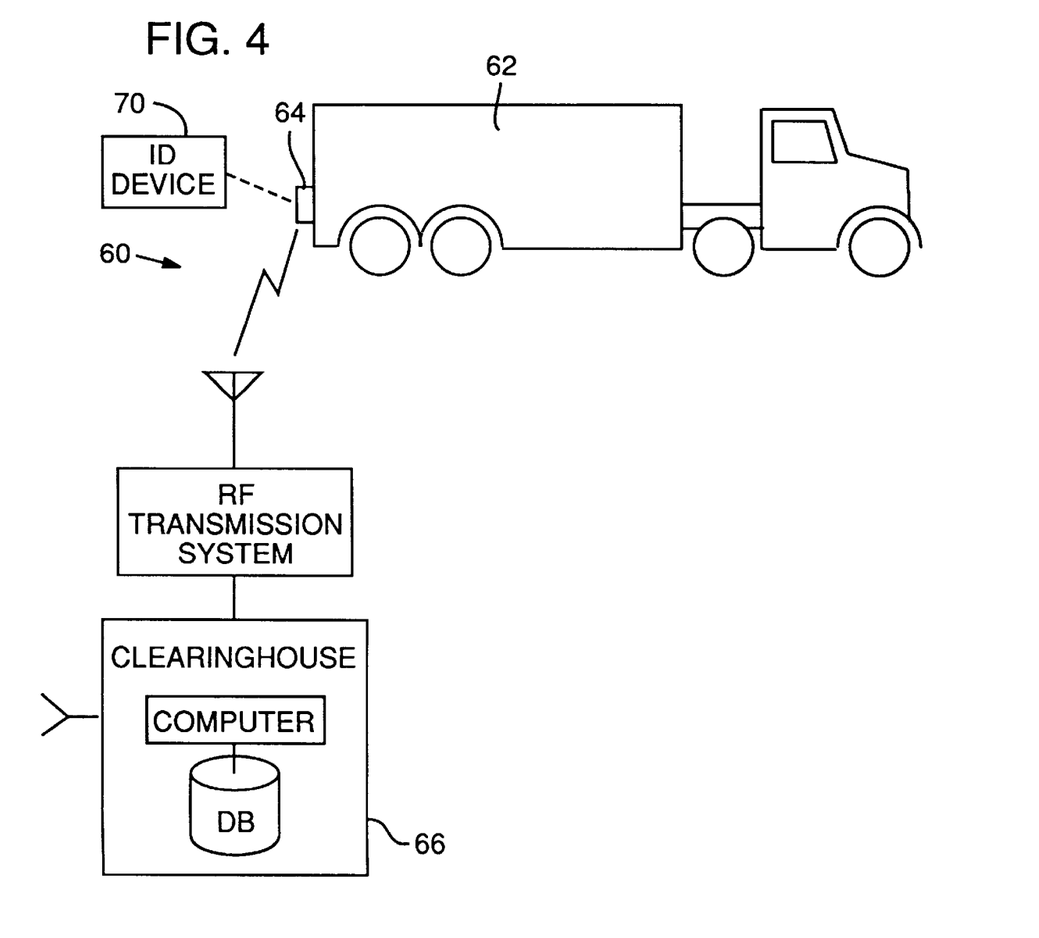
FIG. 4 illustrates a secure access system according to a fourth embodiment of the present invention.

A fourth embodiment 60 according to the present invention is shown in FIG. 4 and is described, by way of example, in the context of an access control device for a delivery truck 62.

Delivery trucks are opened several times during a single run, raising inventory control issues. In accordance with this embodiment of the invention, a delivery truck is equipped with an electronic access control device 64 that guards against unauthorized opening.

In the illustrated embodiment, the delivery company calls a clearinghouse 66 and identifies the sequence of deliveries the truck is to make. Each possible destination is assigned an identification number, and the desired sequence is programmed by entering (using a Touch Tone pad or the like) the numbers corresponding to the scheduled deliveries in their proper order. After suitable verification checks, the clearinghouse transmits to the targeted truck access control device 64 the authorized schedule of stops, which data is received and stored in a memory 68.

When the truck arrives at its first delivery stop, the truck access control device 64 senses this fact by detecting an identification device 70 maintained at that location. The identification device may be a proximity card mounted at the loading dock, or may be an electronic key carried by a manager employed at the first delivery stop. If the detected identification device corresponds to the first expected stop that had earlier been programmed, the truck access control device unlocks, permitting access to the truck's contents. A record of this access is logged in the access control device memory 68, providing data as to the time of the access and the location and/or identity of the accessing party.

When the truck thereafter goes to its second stop, this process is repeated.

If the truck visits an unauthorized location, the access control device will sense either the absence of an identification device, or will sense an identification device that does not correspond to an authorized stop. In either case, the access control device will block access to the truck's contents.

Although the access control device 64 is not particularly detailed in FIG. 4, it can take the same form as lock 12 of FIG. 1 (but with a lock mechanism adapted to secure the doors of a delivery truck).

In the above-described first form 10 of the invention, a limited period of authorization (a "time window") is sometimes employed as an additional safeguard against unauthorized accesses. Time windows can be employed in the FIG. 4 form of the invention. However, due to foreseeably unpredictable delays in completing scheduled delivery runs, a different additional safeguard is more commonly used. That safeguard is to require that the truck make its scheduled deliveries in the order they are scheduled. If a delivery stop is made out of the programmed sequence, the access control device 64 will refuse to open.

The route sequence can be modified at any time by new transmissions from the clearinghouse. Thus, if circumstances make it impossible to complete the deliveries in the order scheduled, the driver can call the delivery company and ask that the schedule be suitably revised. The company can then call the clearinghouse and cause the access control device to be reprogrammed accordingly.

In a preferred form of this embodiment, the truck security system is integrated with a satellite vehicle locator system, which may be of the sort disclosed in U.S. Pat. Nos. 4,897,661, 4,897,642, 4,359,733 or 4,239,447.

In another preferred form of this embodiment, the lock device transmits data back to a central station identifying the identification devices as it encounters them. By this arrangement, the truck can be tracked through its route.

While the above-described form of the fourth embodiment provides the radio-equipped (and radio-programmable) lock on the truck, and radio-less identification devices at the various delivery stops, in other forms of this embodiment these elements can be transposed. That is, a radio-less lock on the truck can cooperate with radio-reprogrammable identification devices at the various delivery stops to open the truck lock if the radio-reprogrammable identification devices have been suitably programmed.

General Considerations

In high security applications of the foregoing embodiments, the access control device can be configured to require the presence of two (or more) authorized users before permitting access to the secured area. If two different authorized users are not detected within a given period (such as 60 seconds), the lock will refuse to unlock. Another high-security variation requires a specific sequence of users. That is, a system can require that a predetermined user accesses the lock before any other users gain access. This is useful, for example, when a manufacturing facility desires that a manager be present in a given area before any other employees are admitted.

A related variant is to require the presence of multiple users at multiple locations within some window of simultaneity (such 5 seconds). This is useful, for example, in the start-up of very large machinery (such as a newspaper printing plant) which may require the presence of monitoring personnel at a variety of locations at a given time. Radio transmissions can be employed to confirm the presence of such persons at their respective stations at the moment of startup. If such persons are not detected, the machinery is locked from operating.

In yet other high security applications, it is desirable to RF-preauthorize not just the key or the access control device, but rather to RF-preauthorize both.

Many applications presently served by other security mechanisms can be more advantageously served by a secure entry system according to the present invention. Accordingly, it is often desirable to implement the access control device of the present invention in a fashion that facilitates its retrofitting into existing applications and installations.

As is disclosed more fully in the electronic lock patents listed below, it is often desirable to partition a system (or site) into different zones, each having different access codes or authorization levels. By this arrangement, different classes of users can readily be assigned permission to access different access control devices within the system.

It will be recognized that in embodiments employing radio transmissions from power-limited devices, the range of transmission may be limited. Transmissions may also be degraded by the location of the device when transmitting and the characteristics of surrounding terrain. Accordingly, it is often desirable to provide one or more conventional repeater stations throughout a geographical area served by the system. Such stations receive the weak signal from a power-limited device, amplify it, and rebroadcast it to the destination station. In a sophisticated system, a geosynchronous satellite can be employed as a repeater. U.S. Pat. Nos. 4,189,675 and 4,831,619 show systems of this sort. Alternatively, path losses associated with transmissions to geosynchronous altitude can be greatly reduced by employing a plurality of low altitude satellites. Yet another option is use of a plurality of repeater satellites in elliptical orbit, as disclosed in U.S. Pat. No. 4,854,527.

It will further be recognized that the transmissions from the clearinghouse to the receiving units are desirably made redundantly so as to reduce the likelihood of a failed transmission. Systems for redundantly transmitting messages in paging systems are well known and are disclosed, by way of example, in U.S. Pat. Nos. 4,897,835 and 4,713,808.

In the preferred embodiments, the transmissions from the clearinghouse to the receiver-equipped units are made in an encoded fashion so that an RF eavesdropper cannot readily decipher the outgoing data.

While, in the above-described systems, the authorization signal is transmitted in advance of an encounter between a user and an access control device, in alternative embodiments this needn't be the case. For example, an access control device can detect the identify of a user, inquire of the clearinghouse whether the user is authorized, and if so permit access to the secured area. Delays associated with the transmission from the access control device to the clearinghouse, the computer check at the clearinghouse, and the transmission from the clearinghouse back to the access control device, however, make such a system unsuitable for many applications.

Voice identification systems suitable for use with the present invention are disclosed, inter alia, in U.S. Pat. Nos. 5,023,901, 4,989,249, 4,843,377, 4,833,717, 4,601,052, 4,378,469, 4,100,370 and 4,078,154, and references cited therein.

Retinal identification systems suitable for use with the present invention are disclosed, inter alia, in U.S. Pat. Nos. 5,055,658, 4,993,068, 4,975,969, 4,641,349 and 4,109,237, and references cited therein.

Fingerprint identification systems suitable for use with the present invention are disclosed, inter alia, in U.S. Pat. Nos. 4,995,086, 4,983,036, 4,977,601, 4,944,021, 4,783,823 and 4,690,554, and references cited therein.

Proximity identification systems suitable for use with the present invention are disclosed, inter alia, in U.S. Pat. Nos. 4,935,724, 4,888,474, 4,863,546, 4,855,583, 4,808,803, 4,717,816, 4,617,876, 4,612,877, 4,546,241, 4,475,481, 4,455,484, 4,408,122 and 4,226,361, and references cited therein.

Electronic lock system technology, including real estate lockbox technology, suitable for use with the present invention is disclosed, inter alia, in U.S. Pat. Nos. 3,857,018, 3,878,511, 3,906,447, 4,079,605, 4,092,524, 4,148,012, 4,148,092, 4,201,887, 4,325,240, 4,353,064, 4,411,144, 4,439,670, 4,509,093, 4,525,805, 4,532,783, 4,558,175, 4,575,719, 4,609,780, 4,665,397, 4,727,368, 4,766,746, 4,777,556, 4,800,255, 4,808,993, 4,851,652, 4,864,115, 4,887,292, 4,896,246, 4,914,732, 4,916,443, 4,929,880, 4,947,163, 4,988,987, 5,014,049 and 5,046,084, and in copending applications Ser. Nos. 07/740,424, 07/790,642 and 07/806,801, and references cited therein.

In certain embodiments, the field of the present invention encompasses cellular communication techniques and systems. The artisan is thus presumed to be familiar with this field of art, which includes—by way of cursory example—

U.S. Pat. Nos. 4,965,820, 4,932,049, 4,887,265, 4,706,273 and 4,697,281.

More generally, the present invention encompasses the field of RF communications equipment, with which the artisan is also presumed to be familiar. U.S. Pat. Nos. 5,031,233, 5,029,237, 4,944,025, 4,897,835, 4,885,802 and 4,713,808 are cited as illustrative of miniaturized RF receivers known in this art.

The disclosures of the prior art and pending applications referenced in the foregoing specification are incorporated herein by reference.

From the foregoing, it will be recognized that the present invention permits, among its many other features, the access parameters of doors or other access control devices to be customized by RF transmissions, rather than by visits with a programming device or by wiring to a central control station.

Having described the principles of our invention with reference to several preferred embodiments and variations thereon, it should be apparent that the invention can be modified in arrangement and detail without departing from such principles. For example although the invention is described with reference to secured doors, trucks and real estate lockboxes, it is readily applicable to other uses. Computers, cars and file cabinets, for example, all can be equipped with control systems according to the present invention to assure that only authorized persons gain access thereto. (In many such applications, the car or other device is already equipped with one or more other security mechanisms. A device according to the present invention can thus be employed to provide an additional level of safeguard. A car, for example, is already provided with an ignition lock to deter theft. A proximity card-based system according to the present invention can be added for increased security. When the user parks the car in his home garage or other secure locale, the identification card can be left in the car, rendering the lock "unlocked." However, when parking in less secure locales, the user can take the card out of the car to provide additional security.)

Although the preferred embodiments have been described as including certain combinations of features, alternative embodiments can readily be designed that include other combinations of the features disclosed herein and in the documents incorporated by reference.

Accordingly, it should be recognized that the foregoing embodiments are illustrative only and should not be taken as limiting the scope of our invention. Instead, we claim as our invention all such modifications as may come within the scope and spirit of the following claims and equivalents thereto.

We claim:

1. A method of operating a secure entry system, the system including a lock that controls access to a secure area, the system further including a central station, the method comprising the steps;

establishing communication between the central station and a user remote from the central station;

identifying to the central station the lock to which the user seeks access, said identifying not requiring the user be in proximity with the lock;

verifying access qualifications of the user to the central station;

transmitting to the lock a radio authorizing signal to authorize the user to access the area secured by the lock;

identifying the presence of the user at the lock;

operating a mechanism associated with the lock to aid in entry to the area secured by the lock;

logging access data relating to operations of the lock mechanism in the memory in the lock; and relaying said logged access data from the lock to a remote location via radio transmission.

2. The method of claim 1 which further includes compiling a batch of access data in the memory, and relaying said batch of logged access data to the remote location via a radio transmission.

3. A method of operating a secure entry system, the system including a lock that controls access to a secure area, the system further including a central station, the method comprising the steps;

establishing communication between the central station and a user remote from the central station;

identifying to the central station the lock to which the user seeks access, said identifying not requiring the user be in proximity with the lock;

verifying access qualifications of the user to the central station;

transmitting to the lock a radio authorizing signal to authorize the user to access the area secured by the lock;

identifying the presence of the user at the lock;

operating a mechanism associated with the lock to aid in entry to the area secured by the lock; and wherein the lock is normally powered from an internal battery, rather than from an external power source.

4. A method of operating a secure entry system, the system including a lock that controls access to a secure area, the system further including a central station, the method comprising the steps;

establishing communication between the central station and a user remote from the central station;

identifying to the central station the lock to which the user seeks access, said identifying not requiring the user be in proximity with the lock;

verifying access qualifications of the user to the central station;

transmitting to the lock a radio authorizing signal to authorize the user to access the area secured by the lock;

identifying the presence of the user at the lock by operating a keypad on a handheld access device coupled to but distinct from the lock; and operating a mechanism associated with the lock to aid in entry to the area secured by the lock.

5. A method of operating a secure entry system, the system including a lock that controls access to a secure area, the system further including a central station, the method comprising the steps;

establishing communication between the central station and a user remote from the central station;

identifying to the central station the lock to which the user seeks access, said identifying not requiring the user be in proximity with the lock by providing tone data to identify one of several locks;

verifying access qualifications of the user to the central station;

transmitting to the lock a radio authorizing signal to authorize the user to access the area secured by the lock;

identifying the presence of the user at the lock by providing tone data to identify the user; and operating a mechanism associated with the lock to aid in entry to the area secured by the lock.

6. A method of operating a secure entry system, the system including a lock that controls access to a secure area, the system further including a key and a central station, the method comprising the steps:

establishing communication between the central station and a user remote from the central station;

identifying to the central station the lock to which the user seeks access;

verifying access qualifications of the user to the central station;

transmitting to the key a radio enabling signal so as to enable the key to access the lock; and using the key to operate a mechanism associated with the lock to aid in entry to the area secured by the lock.

7. The method of claim 6 which further includes authorizing the key to access the area secured by the lock within a time window.

8. The method of claim 7 which further includes:

transmitting a radio data signal to the key, data in said signal determining a parameter of the time window; and programming a timer in the key in accordance with said data.

9. The method of claim 7 in which said time window has a beginning and an end, the end being a predetermined time period after the beginning.

10. The method of claim 6 which further includes:

logging access data relating to operations of the lock mechanism.

11. The method of claim 10 which further includes:

logging said access data in a memory in the key; and relaying said logged access data to a remote location via a radio transmission.

12. The method of claim 11 which further includes compiling a batch of access data in the memory, and relaying said batch of logged access data to the remote location via a radio transmission.

13. A method of operating a secure entry system, the secure entry system including an access control device that has a radio receiver, processing circuitry, and a lock mechanism associated therewith, the method comprising the steps:

operating a cellular telephone to make a radio broadcast, the radio broadcast including signal tones modulated thereon;

receiving said broadcast including signal tones;

providing data signals corresponding to the received signal tones to the processing circuitry associated with the access control device;

operating the lock mechanism in response to said provided data signals; and storing data relating to the lock operation in a memory, the data indicating at least the date the lock was operated.

14. The method of claim 13 which further includes receiving the radio broadcast at a location remote from the access control device and, in response thereto, transmitting data signals from said remote location to the access control device.

15. The method of claim 14 in which the transmitting step includes transmitting by radio.

16. The method of claim 13 which further includes receiving the radio broadcast at the access control device.

17. The method of claim 13 which further includes:

receiving the radio broadcast at a location remote from the access control device and, in response thereto, transmitting data signals from said remote location back to the cellular telephone;

receiving data signals from the remote location at the cellular telephone; and acoustically coupling data signals from the cellular telephone to the access control device.

18. The method of claim 13 which further includes establishing the authority of a user prior to operating the lock mechanism.

19. The method of claim 18 in which the establishing the authority step includes providing a personal identification code.

20. The method of claim 18 in which the establishing the authority step includes signalling from the lock to a remote location and receiving an authorization signal from the remote location prior to operating the lock mechanism.

21. The method of claim 18 in which the establishing the authority step includes operating a keypad on a handheld access device coupled to but distinct from the access control device.

22. The method of claim 13 which further includes making the lock mechanism susceptible to opening for a predetermined period upon receipt of the data signals, and thereafter rendering the mechanism insusceptible to opening.

23. The method of claim 13 in which the radio broadcast from the cellular telephone is received directly by a receiver in the access control device.

24. The method of claim 13 which further includes providing reprogramming instructions by radio to the processing circuitry, the reprogramming instructions changing the operating characteristics of the lock.

25. The method of claim 6 which includes transmitting the radio enabling signal to the key when the key is remote from the lock.

26. The method of claim 22 in which the lock controls access to a dwelling key contained within a real estate lockbox.

27. The method of claim 25 which includes transferring power to operate the mechanism associated with the lock from the key to the lock.

28. The method of claim 25 in which the establishing communication step includes placing a telephone call from the user to the central station.

29. The method of claim 25 in which the first identifying step includes providing Touch Tone signals to the central station, the Touch Tone signals identifying the lock to which the user seeks access.

30. The method of claim 25 in which the step of using the key includes operating a keypad on the key to enter a code.

31. The method of claim 25 in which the radio enabling signal transmitted to the key includes data specifying a time window within which the user can access the area secured by the lock.

* * * * *

UNITED STATES PATENT AND TRADEMARK OFFICE
CERTIFICATE OF CORRECTION

PATENT NO.      : 6,072,402
DATED           : June 6, 2000
INVENTOR(S)     : John M. Kniffin et al.

It is certified that error appears in the above-identified patent and that said Letters Patent is hereby corrected as shown below:

Column 4,
Line 55, "to reports" should read -- to relay reports --.

Column 14,
Line 44, "method of claim 22" should read -- method of claim 25 --.

Signed and Sealed this

Twenty-ninth Day of July, 2003

JAMES E. ROGAN
*Director of the United States Patent and Trademark Office*